(12) United States Patent
Fong et al.

(10) Patent No.: US 7,813,893 B2
(45) Date of Patent: Oct. 12, 2010

(54) METHOD OF PROCESS TREND MATCHING FOR IDENTIFICATION OF PROCESS VARIABLE

(75) Inventors: Kien Hoong Fong, Singapore (SG); Wei Fu, Singapore (SG); Jun Shi, Singapore (SG)

(73) Assignee: TECH Semiconductor Singapore Pte Ltd, Singapore (SG)

( * ) Notice: Subject to any disclaimer, the term of this patent is extended or adjusted under 35 U.S.C. 154(b) by 595 days.

(21) Appl. No.: 11/655,024

(22) Filed: Jan. 18, 2007

(65) Prior Publication Data

US 2008/0177399 A1 Jul. 24, 2008

(51) Int. Cl.
*G05B 13/04* (2006.01)
(52) U.S. Cl. ............................ 702/179; 702/81; 702/82; 702/83; 702/84; 702/181; 700/28; 700/108; 700/109; 700/110; 700/121
(58) Field of Classification Search ............... 702/82, 702/83, 84, 179–181; 700/28–32, 50, 51, 700/52, 95, 96, 108–110, 121, 174
See application file for complete search history.

(56) References Cited

U.S. PATENT DOCUMENTS

| 5,339,257 | A * | 8/1994 | Layden et al. ................ 702/84 |
| 5,951,611 | A | 9/1999 | La Pierre |
| 5,987,398 | A * | 11/1999 | Halverson et al. ........... 702/179 |
| 6,223,091 | B1 * | 4/2001 | Powell ........................ 700/80 |
| 6,314,328 | B1 * | 11/2001 | Powell ........................ 700/80 |
| 6,445,969 | B1 * | 9/2002 | Kenney et al. .............. 700/108 |
| 6,577,323 | B1 | 6/2003 | Jamieson et al. |
| 6,591,182 | B1 | 7/2003 | Cece et al. |
| 6,690,980 | B2 * | 2/2004 | Powell ........................ 700/80 |
| 6,825,050 | B2 * | 11/2004 | Huang et al. ................... 438/5 |
| 6,970,857 | B2 | 11/2005 | Card et al. |
| 7,031,878 | B2 | 4/2006 | Cuddihy et al. |
| 2003/0028274 | A1 * | 2/2003 | Powell ........................ 700/95 |
| 2003/0198388 | A1 | 10/2003 | Wenzel et al. |
| 2004/0088100 | A1 | 5/2004 | Volponi |
| 2005/0010546 | A1 * | 1/2005 | Nowotny et al. .............. 707/1 |
| 2005/0130329 | A1 | 6/2005 | Liao et al. |
| 2006/0095237 | A1 | 5/2006 | Wang et al. |
| 2008/0177399 | A1 * | 7/2008 | Fong et al. .................... 700/30 |

* cited by examiner

*Primary Examiner*—Carol S Tsai
(74) *Attorney, Agent, or Firm*—Saile Ackerman LLC; Stephen B. Ackerman

(57) ABSTRACT

A method that involves matching the trend of process outcome with the trend of process variables to identify the variables that have an impact on the process outcome is disclosed. The method for process trend matching comprises processing of raw data of process outcome and of process variables using an outlier filtering method, smoothing these data using common smoothing algorithm like Kernel, dividing smoothed raw data equally into time intervals, computing the gradients of the points at both ends of the time intervals, and translating the gradients into a scale based on the magnitude of the gradients. The following steps comprise comparing the process outcome and each process variable independently for same time frame, and assigning a score for both outcome and variable. The sum of the scores is then computed which is used to determine the quality of fit. A real-time monitoring system is then set up to monitor these variables for any drifts. When a drift is detected, troubleshooting activity will be triggered and actions taken to resolve the drift, after which monitoring of the variable will be restarted.

54 Claims, 4 Drawing Sheets

| Variables | Sum | % Fit | Std Dev | # of Points | Start Date | End Date |
|---|---|---|---|---|---|---|
| ESDA\|BIN \| MVL \| BIN(#) | 125 | 40.322581 | 3.9298704 | 310 | 4/27/2006 | 8/1/2006 |
| ESDA\|BIN \| SCOL \| BIN(#) | 116 | 37.419355 | 6.1629816 | 310 | 4/27/2006 | 8/1/2006 |
| FINAL\|PARAM \| 1505 \| IDS_P_THN_300X150 \| AVG | 108 | 34.83871 | 1.8946733 | 310 | 4/27/2006 | 8/1/2006 |
| FINAL\|PARAM \| 26 \| BV_NCH_CAP_PER_GED_THN \| AVG | 106 | 34.193548 | 7.7454013 | 310 | 4/27/2006 | 8/1/2006 |
| FINAL\|PARAM\| 258 \| BLINE_RES_435/14.5 \| AVG | -97 | 31.290323 | 5.5347076 | 310 | 4/27/2006 | 8/1/2006 |
| FP\|PROBE \| N \| BIN(#) | 95 | 30.645161 | 6.2787903 | 310 | 4/27/2006 | 8/1/2006 |
| FINAL\|PARAM \| 248 \| 41SLOT_RES_120/1.2 \| AVG | 92 | 29.677419 | 9.3304127 | 310 | 4/27/2006 | 7/29/2006 |
| ESDA\|BIN \| SBIT \| BIN(#) | 77 | 24.83871 | 8.8165378 | 310 | 4/27/2006 | 8/1/2006 |
| FP\|rd \| L \| % | 75 | 24.193548 | 7.4778989 | 310 | 4/27/2006 | 8/1/2006 |
| ESDA\|BIN \| MWD \| BIN(#) | 67 | 21.612903 | 3.1255234 | 310 | 4/27/2006 | 8/1/2006 |

*FIG. 3*

METHOD OF PROCESS TREND MATCHING FOR IDENTIFICATION OF PROCESS VARIABLE

BACKGROUND OF THE INVENTION (1) Field of the Invention

This invention relates to a method for matching process trend. In particular, a method that involves matching the trend of process outcome with the trend of process variables to identify the variables that have an impact on the process outcome.

(2) Description of the Prior Art

In semiconductor manufacturing, the known method to identify a process variable that has an impact on the process outcome involves a numerical correlation study using least square method. This method is effective in identifying process variables that have a direct relationship with process outcome. It involves finding the "best fit" line in which the square of the distance between the points and this line is the minimum. Such means of finding "best fit" line takes into account all data points including the baseline shift which makes the best fitted line inaccurate.

However, most of the time, a variable and an outcome do not have a direct relationship. For such cases, the computed least square value will become insignificant as there may be characteristic shape of changes in the variable and outcome. To observe such characteristic shape of changes, process variables and outcome charts are plotted and reviewed manually to determine the probable process variables that have an impact on the process outcome. This manual mean of visual analysis which involves observation of baseline shift and changes of process trend pattern is tedious, subjective and prone to human error. In view of this, there is a need for an automated method for process trend matching to identify probable process variables that have impact on process outcome.

Prior art patent documents, U.S. Pat. No. 6,591,182 by Cece et al., U.S. Pat. No. 7,031,878 by Cuddihy et al., U.S. Pat. No. 5,951,611 by La Pierre, U.S. Pat. No. 6,577,323 by Jamieson et al., U.S. Pat. No. 5,339,257 by Layden et al., and U.S. 2003/0198388 by Wenzel et al. comprise features that relate to identifying probable process variables that have impact on process outcome. U.S. Pat. No. 7,031,878 by Cuddihy et al. relates to an automatic method for trend analysis wherein outliers are removed using standard statistical technique, performance data is split by time to allow linear or non-linear regressions to be run through each data segment, followed by evaluating the split points to determine the one most likely to represent a given problem.

Furthermore there are patents in the field of identifying variables that have an impact on a process outcome:

U.S. patent Publication (US 2006/0095237 to Wang et al.) proposes a system and method for yield management wherein a data set containing one or more prediction variable values and one or more response variable values is input into the system. The system can process the input data set to remove prediction variables with missing values and data sets with missing values based on a tiered splitting method to maximize usage of all valid data points. The processed data can then be used to generate a model that may be a decision tree. The system can accept user input to modify the generated model. Once the model is complete, one or more statistical analysis tools can be used to analyze the data and generate a list of the key yield factors for the particular data set.

U.S. patent Publication (US 2005/0130329 to Liao et al.) discloses a method for predicting a source of semiconductor part deviation. The method includes the steps of selecting at least one chart including part parameters and associating with each of the part parameters at least one fabrication process, which are stored in recipes, scanning the selected charts for deviations in the part parameters, wherein the deviations are determined by monitoring a trend of recent values of the part parameters, indicating the charts containing the part parameters wherein the part parameter values are determined as being outside of at least one trend tolerance value associated with the parameter, identifying, in each of the indicated charts at least one process associated with each of the part parameter deviations outside the at least one tread tolerance value, and determining a source of the parameter deviation by correlating each of the identified at least one processes. In one aspect of the invention, the selected chart includes the relationship between part parameters and processes.

U.S. patent Publication (US 2004/0088100 to Volponi) discloses a method of performing diagnostics on a system comprising receiving a plurality of measurement parameters, each corresponding to one of a plurality of parameters at a time k, forming a deviation vector from the plurality of measurement parameters, calculating an initial deviation vector from an initial fault vector, calculating a multiple fault isolation deviation vector using the initial deviation vector and the deviation vector, determining if an event is in progress using the multiple fault isolation deviation vector, performing statistical data validity to set a present inhibit flag and a past inhibit flag, and performing module performance analysis according to the present inhibit flag and the past inhibit flag.

SUMMARY OF THE INVENTION

A principal object of the present invention is to optimize the performance of a manufacturing line.

A further object of the present invention is to identify corrective actions for manufacturing process variables endangering the process outcome of a manufacturing line.

Another object of the present invention is to identify manufacturing process variables affecting mostly process outcome.

Another object of the present invention is to activate corrective actions for process variables exceeding defined upper or lower limits.

In accordance with the objects of this invention a method to identify process variables of a manufacturing line having impact on process outcome in order to trigger immediate changes of process variables in case of endangering deviations to avoid degradation of process outcome has been achieved. The method invented comprises, first, identifying by statistical methods process variables affecting mostly process outcome using process variable raw data. The following steps comprise performing real-time monitoring of process variables identified as affecting process outcome, and activating corrective actions for process variables exceeding their defined upper or lower limit. After the trouble shooting the real-time monitoring of the process variables identified as affecting the process outcome is started again.

In accordance with the objects of this invention a method to identify process variables of a semiconductor manufacturing line having impact on process outcome in order to trigger immediate changes of process variables in case of endangering deviations to avoid degradation of process outcome has been achieved. The method invented comprises, first, steps to identify process variables affecting mostly a process outcome. This identification comprises the steps of (1) filtering outliers in raw data of said process outcome and of said process variables followed by smoothing the filtered data, (2)

dividing filtered and smoothed data of said process outcome and of the process variables into same time intervals and compute gradients between successive time intervals, (3) translating said gradients of the process outcome data and of the process variables data into scales based on magnitude of the gradients, (4) comparing the scaled gradients of said process outcome data with the scaled gradients of each of said process variables data independently for said time intervals and assign scores depending upon the result of the comparison, (5) determining quality of correlation between said process outcome and each of the process variables by adding the scores of previous step followed by dividing the sums of scores by respective number of data points, and (6) sorting the process variables according to their impact on process outcome. Furthermore the method invented comprises the steps of (7) performing real-time monitoring of said process variables identified as affecting process outcome, (8) activating corrective actions for said process variables if they are exceeding their defined upper or lower limit, and (9) going back to step (7).

BRIEF DESCRIPTION OF THE DRAWINGS

In the accompanying drawings forming a material part of this description, there is shown:

FIG. 3 shows a table comprising examples of data of process variables having impact to process outcome.

DESCRIPTION OF THE PREFERRED EMBODIMENTS

The preferred embodiments disclose methods to identify manufacturing process variables that have an impact on manufacturing process outcome regardless of the presence of a strong statistical (numerical) relationship and to trigger immediate actions in case of endangering deviations to correct changes in process variables instead of having to wait for downstream data.

The identification of the process variables having impact on the process outcome comprises matching the trend of process outcome with the trend of process variables.

Figure 1:
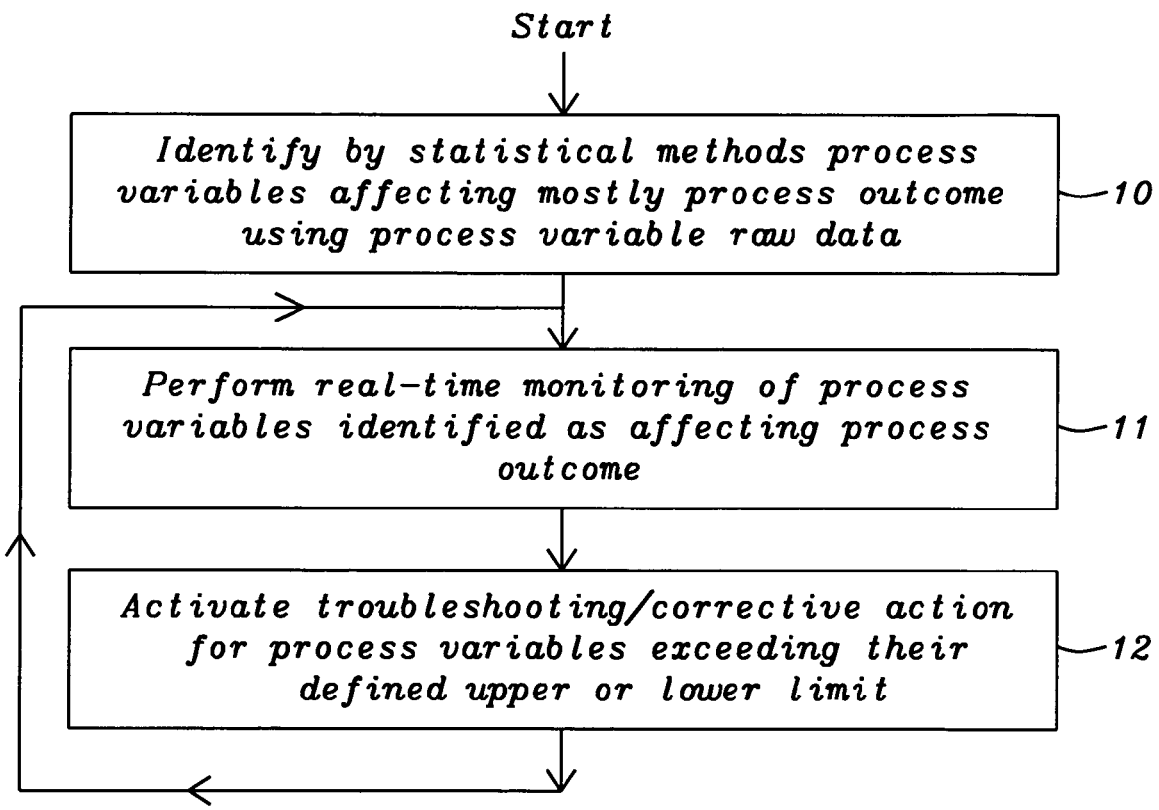
FIG. 1 shows the a flowchart of the basic steps of the method invented

FIG. 1 shows basic steps of a preferred embodiment of the method invented. The preferred embodiment has been designed as a non-limiting example for a semiconductor manufacturing line, it should be understood that the method invented could be used for other kinds of manufacturing lines also. Step 10 illustrates the identification by statistical methods of process variables affecting mostly the outcome of the manufacturing process. The following step 11 shows a real-time monitoring of process variables identified as affecting process outcome. The last step 12 demonstrates troubleshooting or corrective actions for process variables exceeding their defined upper or lower limits. The process flow continues then with real-time monitoring of step 11.

Figure 2:
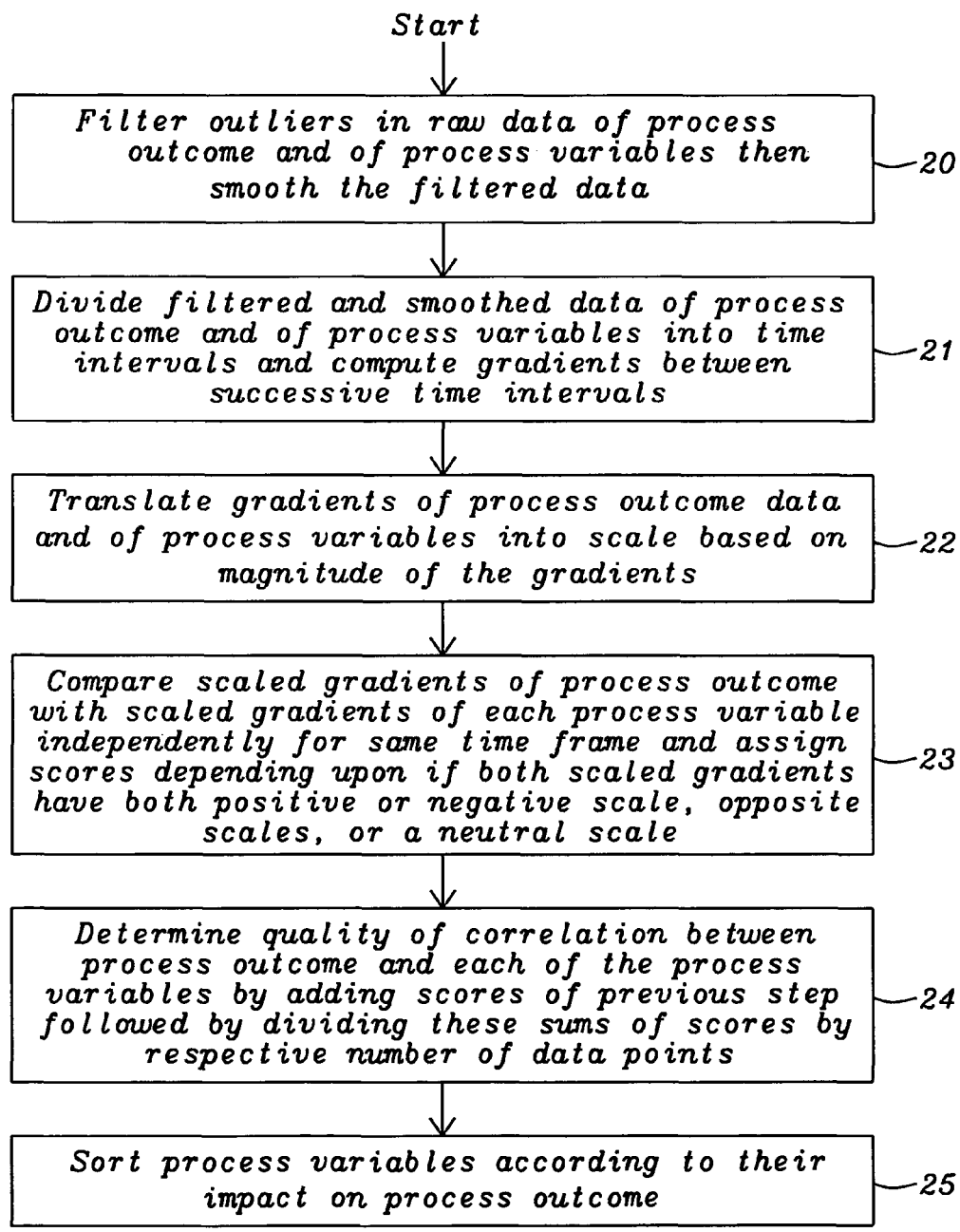
FIG. 2 illustrates a flowchart detailing the steps to identify process variables affecting mostly process outcome.

FIG. 2 illustrates in more details step 10 of FIG. 1 showing the identification of process variables affecting mostly the process outcome.

The first step 20 of FIG. 2 demonstrates the filtering of outliers in raw data of process outcome and of process variables followed by a smoothing operation of these filtered data.

In a preferred embodiment of the present invention the method used to filter the outliers within a given data set is the Median Absolute Difference (MAD) method. The MAD method is performed as follows:

First the median (M1) of the data set is obtained and is used as the estimate of the mean. In probability theory and statistics, a median is a number dividing the higher half of a sample, a population, or a probability distribution from the lower half. Then the following steps are performed:

a) The absolute differences between each and every data point of the given data set and median (M1) are computed to arrive at a data set prime.

b) The median (M2) of data set prime is then obtained.

c) The standard deviation sigma ($\sigma$) of the original data set is estimated as 1.5 times of M2.

d) Outliers of the original data set are then filtered using in a preferred embodiment M 1.+−. 12.sigma.

It should be understood that the identification of outliers by setting the limits to $M1 \pm 12\sigma$ is a non-limiting example. Other deviations in the order of magnitude of $\pm 12\sigma$ are possible as well.

Alternatively, in another embodiment of the present invention a mean value has been used as basis for the identification of outliers, wherein the limits were set to Mean value +/−N.times. Standard Deviation $\sigma$, wherein N is a user input value in the order of magnitude of 3-6.

As shown in step 20, the filtered data of process outcome and of process variables are smoothed after the filtering using smoothing algorithms, an example being Kernel. The following Kernel algorithms have been successfully used for smoothing:

1. Kernel Smoother—fits a smooth curve (spline) to data.

2. Weighted Regression—fits a weighted regression curve to data.

3. Linear—fits a first-degree curve to data, i.e. $Y = \beta 0 + \beta 1 x$

Alternatively, instead of applying algorithms to the filtered data of the process outcome and of process variables, discrete methods can also be employed for smoothing as well. Discrete methods involve finding the difference between 2 successive points and dividing this difference by the actual time interval difference between them.

A typical example of a process outcome could be the resistance of a typical metal line structure. Furthermore it should be understood that it is also possible to control more than one process outcome parameter at any given time, subject to the resources available. A same or different set of matching process variables may be needed depending on what is the process outcome parameter that will be controlled.

The following step 21 of FIG. 2 illustrates dividing filtered and smoothed data of process outcome and of process variables into time intervals and compute gradients between successive time intervals.

In a first embodiment of the present invention the filtered and smoothed data sets are divided into fixed time intervals of 8 hours each, which was found to be the most optimal after repeated simulations. Nevertheless 8 hours are a non-limiting example only. The gradients of the points at both ends of the time intervals are computed for subsequent steps.

In an alternative embodiment of the invention a variable time interval method has been employed to replace fixed time intervals described above. The time interval for the parameter of interest is still first divided into fixed time period of e.g. 8 hours between 2 data points. The gradients are likewise computed. It differs from the earlier method henceforth that new time intervals are determined only when there is a change in signs between 2 successive gradients. The process parameters will then use the time intervals determined by this method on the parameter of interest.

The duration of these time intervals is obtained through iterations aimed at getting the best resolution with a reasonable amount of computing resources used. The time interval can be shortened further but that will result in more resources needed while increasing it will lead to lower accuracy of the results.

The following step 22 of FIG. 2 illustrates translating gradients of process outcome and of process variables data into a scale based on magnitude of gradients computed in the previous step 21.

As non-limiting example in a preferred embodiment the gradients obtained in step 21 are converted into trigonometric degrees by taking inverse tangents. The degrees are then converted to positive, neutral, or negative scale of e.g. 1, 0 and −1 by using the below conversion table:

| Degrees | Scale |
| --- | --- |
| >1 | +1 |
| −1 to 1 | 0 |
| <−1 | −1 |

Step 23 of FIG. 2 illustrates comparing scaled gradients of process outcome with scaled gradients of each process variables independently for same time frame and assigning scores depending upon if both scaled gradients have both positive or negative scale, opposite scales, or a neutral scale.

With the scales obtained in steps 22 for each process variable and for process outcome, a simple comparison is done to obtain the "fitness" factor; this means the amount of correlation between each process variable and the process outcome. All the comparisons are between individual process variables and the process outcome. In a preferred embodiment a score of +1 is given if both the scales of the process outcome and the process variable have the same sign and a score of −1 if both have opposite sign of one another. A score of 0 is given if one of the scale (but not both) is neutral.

Alternatively only the absolute values of the gradients are taken into account. A score of +1 is assigned if the magnitudes of process outcome and variable are the same; otherwise the value of zero is assigned.

Each set of process variable will have its own string of scores after the comparison is done. The sum of scores is then computed and the % fit, i.e. correlation, is also calculated by dividing the absolute sum by the total number of data points.

The process variables with the largest % fit is deemed to be the most likely factor to affect the process outcome followed by the next larger % fit and so on. In the event of a tie between 2 variables, a tiebreaker is used. The ratio of the absolute degree of the process variable and the absolute degree of the process outcome is calculated for the corresponding time interval. This is repeated for all data points. The standard deviation is then computed among these ratios, with smaller magnitude the better fit.

Step 24 of FIG. 2 illustrates determining the quality of correlation between process outcome and each of process variables by adding scores of previous step 23, and in step 25 each process variables are sorted according their "fitness" or degree of correlation to process outcome.

Step 25 illustrates the sorting of the process variables according to their impact, i.e. "% fit", on process outcome.

FIG. 3 shows an example of a list of process variables being sorted according to % fitness/correlation to the process outcome. The highest value in the list is 40.322%; the lowest value is 21.612%. Furthermore the list shows the sum of scores, standard deviation, and number of points/intervals and dates of records.

As consequence the process variables having the highest impact/correlation will get the highest allocation of monitoring and corrective actions.

Figure 4:
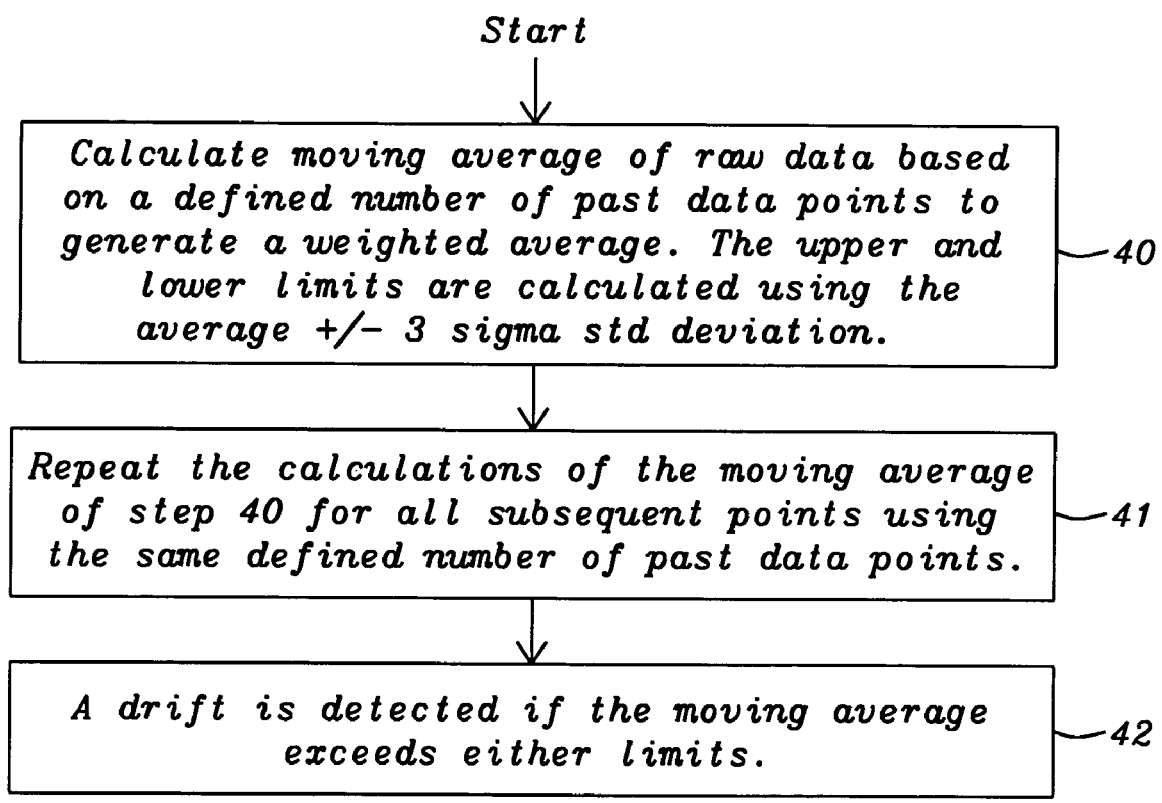
FIG. 4 illustrates a flowchart of the steps to perform real-time monitoring of process variables.

FIG. 4 illustrates in more details step 11 of FIG. 1 showing real-time monitoring of process variables identified as affecting process outcome.

The first step 40 of FIG. 4 demonstrates the calculation of the moving average of raw data of process variables based on a defined number of past data points to generate a weighted average. In a preferred embodiment, as non-limiting example, the past 5 data points were used for this calculation. The upper and lower limits are set-up with these data points and correspond in a non-limiting example to the average value +/−3× standard deviation sigma.

In the next step 41 the moving average calculation is repeated for all subsequent points using the same number of past data points as in step 40. In step 42 a drift is detected if the moving average exceeds either limit. These control limits are fixed for a longer period of time to enable detection of a drift.

Referring to prior art again as disclosed in U.S. Pat. No. 7,031,878 by Cuddihy et al. it should be understood that the present invention can be distinguished from U.S. Pat. No. 7,031,878 since there is no mention of matching the performance data and process parameters. None of the prior art documents cited e.g. U.S. Pat. No. 6,591,182 by Cece et al. or U.S. Pat. No. 5,951,261, 1 by La Pierre has specifically mentioned about taking into consideration of the periodic or non-periodic shift of the baseline of process variables during real-time monitoring. In this aspect, the present invention can be easily distinguished from the prior art.

While the invention has been particularly shown and described with reference to the preferred embodiments thereof, it will be understood by those skilled in the art that various changes in form and details may be made without departing from the spirit and scope of the invention.

What is claimed is:

1. A method to identify process variables of a manufacturing line having impact on process outcome in order to trigger immediate changes of process variables in case of endangering deviations to avoid degradation of process outcome, comprising the steps of:
   (1) identifying by statistical methods said process variables of a manufacturing line affecting mostly process outcome using process variable raw data;
   (2) performing real-time monitoring of said process variables identified as affecting process outcome taking into consideration a periodic or non-periodic shift of the baseline of process variables; and
   (3) activating corrective actions for said process variables if they are exceeding their defined upper or lower limit in order to move said process variables between their defined upper and lower limits.

2. The method of claim 1 wherein said identification by statistical methods is comprising the steps of:
   filtering outliers in raw data of said process outcome and of said process variables followed by smoothing the filtered data;
   dividing filtered and smoothed data of said process outcome and of the process variables into same time intervals and compute gradients between successive time intervals;

translating said gradients of the process outcome data and of the process variables data into scales based on magnitude of the gradients;

comparing the scaled gradients of said process outcome data with the scaled gradients of each of said process variables data independently for said time intervals and assign scores depending upon the result of the comparison;

determining quality of correlation between said process outcome and each of the process variables by adding the scores of previous step followed by dividing the sums of scores by respective number of data points; and sorting the process variables according to their impact on process outcome.

3. The method of claim 2 wherein said filtering of outliers is performed using a Median Absolute Difference method.

4. The method of claim 3 wherein a method of using said Median Absolute Difference method is comprising the steps of:

computing absolute differences between each and every data point of the relevant data set and its median value M1 to achieve a data set prime;

computing a median value M2 of said data set prime;

estimating a standard deviation sigma of said original relevant data set;

filtering all points as outliers from said original relevant data set, which are exceeding a predefined deviation from said median value M1.

5. The method of claim 2 wherein said standard deviation sigma is estimated by 1.5 times of said median value M2.

6. The method of claim 2 wherein all points are defined as outliers having a deviation from the median point M1 in the order of magnitude of 12 times the standard deviation of said relevant data set.

7. The method of claim 2 wherein all points are defined as outliers having a deviation from the mean value of N×σ, wherein σ is the standard deviation and N is a predefined number.

8. The method of claim 2 wherein said smoothing is performed using a Kernel method.

9. The method of claim 8 wherein said Kernel Method is a Kernel Smoother.

10. The method of claim 8 wherein said Kernel Method is a Weighted Regression Method.

11. The method of claim 2 wherein said smoothing is performed using discrete methods.

12. The method of claim 2 wherein said time intervals are fixed time intervals.

13. The method of claim 2 wherein said fixed time intervals have duration of 8 hours each.

14. The method of claim 2 wherein said time intervals are variable time intervals.

15. The method of claim 14 wherein said variable time intervals are only introduced if gradients of two successive fixed time intervals have different signs.

16. The method of claim 14 wherein the duration of said variable time intervals is obtained through iterations aimed at getting the best resolution with a reasonable amount of computing resources used.

17. The method of claim 2 wherein said translation of gradients is comprising the steps of:

converting said gradients into trigonometric degrees by taking inverse tangents; and converting said trigonometric degrees into a scale wherein a positive scale is selected if said inverse tangent is larger than 1, a neutral scale is selected if said inverse tangent is from $-1$ to $+1$, and a negative scale is selected if said inverse tangent is lower than $-1$.

18. The method of claim 2 wherein said scores depending upon the results of said comparison are assigned $+1$ if both the scales of process outcome and process variable have a same sign, $-1$ is assigned if the scales of process outcome and process variable have opposite signs, and zero is assigned if one of the scales is zero.

19. The method of claim 2 wherein said scores depending upon the results of said comparison are assigned $+1$ if the magnitudes of process outcome and process variables are the same, otherwise zero is assigned.

20. The method of claim 2 wherein said quality of correlation is determined by adding for each of said process variable the scores of said comparison followed by a division of the sum of said addition by a number of the data points of each process variable.

21. The method of claim 1 wherein said manufacturing line is a semiconductor manufacturing line.

22. The method of claim 21 wherein said process outcome is a resistance of a typical metal line structure of a semiconductor manufactured in said semiconductor manufacturing line.

23. The method of claim 1 wherein more than one of said process outcome parameters is monitored.

24. The method of claim 23 wherein each of said process outcome parameters has a different set of matching process variables.

25. The method of claim 23 wherein each of said process outcome parameters has a common set of matching process variables.

26. The method of claim 1 wherein said real-time monitoring of said process variables comprises steps of:

calculating moving average of raw data based on a defined number of past data points in order to generate a weighted average and set-up upper and lower limits using these data points; then repeating calculation of moving average for all subsequent data points using the same number of past data points as in previous step; and detecting a drift if said moving average exceeds one of said upper/lower limits.

27. The method of claim 26 wherein said limits are set by said moving average $+/-3\times\sigma$, wherein $\sigma$ is the standard deviation of these data points.

28. The method of claim 26 wherein said defined number of past data points is five.

29. A method to identify process variables of a manufacturing line having impact on process outcome in order to trigger immediate changes of process variables in case of endangering deviations to avoid degradation of process outcome, comprising the steps of:

(1) filtering outliers in raw data of said process outcome and of said process variables of a manufacturing line followed by smoothing the filtered data;

(2) dividing filtered and smoothed data of said process outcome and of the process variables into same time intervals and compute gradients between successive time intervals;

(3) translating said gradients of the process outcome data and of the process variables data into scales based on magnitude of the gradients;

(4) comparing the scaled gradients of said process outcome data with the scaled gradients of each of said process variables data independently for said time intervals and assign scores depending upon the result of the comparison;

(5) determining quality of correlation between said process outcome and each of the process variables by adding the scores of previous step followed by dividing the sums of scores by respective number of data points;

(6) sorting the process variables according to their impact on process outcome;

(7) performing real-time monitoring of said process variables identified as affecting process outcome; and (8) activating corrective actions for said process variables if they are exceeding their defined upper or lower limit in order to move said process variables between their defined upper and lower limits.

30. The method of claim 29 wherein said filtering of outliers is performed using a Median Absolute Difference method.

31. The method of claim 30 wherein a method of using said Median Absolute Difference method is comprising the steps of:

computing absolute differences between each and every data point of the relevant data set and its median value M1 to achieve a data set prime;

computing a median value M2 of said data set prime;

estimating a standard deviation sigma of said original relevant data set;

filtering all points as outliers from said original relevant data set, which are exceeding a predefined deviation from said median value M1.

32. The method of claim 29 wherein said standard deviation sigma is estimated by 1.5 times of said median value M2.

33. The method of claim 29 wherein all points are defined as outliers having a deviation from the median point M1 in the order of magnitude of 12 times the standard deviation of said relevant data set.

34. The method of claim 29 wherein all points are defined as outliers having a deviation from the mean value of N×σ, wherein σ is the standard deviation and N is a predefined number.

35. The method of claim 29 wherein said smoothing is performed using a Kernel method.

36. The method of claim 35 wherein said Kernel Method is a Kernel Smoother.

37. The method of claim 35 wherein said Kernel Method is a Weighted Regression Method.

38. The method of claim 29 wherein said smoothing is performed using discrete methods.

39. The method of claim 29 wherein said time intervals are fixed time intervals.

40. The method of claim 29 wherein said fixed time intervals have duration of 8 hours each.

41. The method of claim 29 wherein said time intervals are variable time intervals.

42. The method of claim 41 wherein said variable time intervals are only introduced if gradients of two successive fixed time intervals have different signs.

43. The method of claim 41 wherein the duration of said variable time intervals is obtained through iterations aimed at getting the best resolution with a reasonable amount of computing resources used.

44. The method of claim 29 wherein said translation of gradients is comprising the steps of:

converting said gradients into trigonometric degrees by taking inverse tangents; and converting said trigonometric degrees into a scale wherein a positive scale is selected if said inverse tangent is larger than 1, a neutral scale is selected if said inverse tangent is from −1 to +1, and a negative scale is selected if said inverse tangent is lower than −1.

45. The method of claim 29 wherein said scores depending upon the results of said comparison are assigned +1 if both the scales of process outcome and process variable have a same sign, −1 is assigned if the scales of process outcome and process variable have opposite signs, and zero is assigned if one of the scales is zero.

46. The method of claim 29 wherein said scores depending upon the results of said comparison are assigned +1 if the magnitudes of process outcome and process variables are the same, otherwise zero is assigned.

47. The method of claim 29 wherein said quality of correlation is determined by adding for each of said process variable the scores of said comparison followed by a division of the sum of said addition by a number of the data points of each process variable.

48. The method of claim 29 wherein said process outcome is a resistance of a typical metal line structure of a semiconductor manufactured in said semiconductor manufacturing line.

49. The method of claim 29 wherein more than one of said process outcome parameters is monitored.

50. The method of claim 49 wherein each of said process outcome parameters has a different set of matching process variables.

51. The method of claim 49 wherein each of said process outcome parameters has a common set of matching process variables.

52. The method of claim 29 wherein said real-time monitoring of said process variables comprises steps of:

calculating moving average of raw data based on a defined number of past data points in order to generate a weighted average and set-up upper and lower limits using these data points; then repeating calculation of moving average for all subsequent data points using the same number of past data points as in previous step; and detecting a drift if said moving average exceeds one of said upper/lower limits.

53. The method of claim 52 wherein said limits are set by said moving average +/−3×σ, wherein σ is the standard deviation of these data points.

54. The method of claim 52 wherein said defined number of past data points is five.

* * * * *